United States Patent [19]

Seko et al.

[11] Patent Number: 4,586,032

[45] Date of Patent: Apr. 29, 1986

[54] WARNING SYSTEM FOR DOZING AT WHEEL

[75] Inventors: Yasutoshi Seko, Yokohama; Takayuki Yanagishima, Yokosuka; Noburu Fukasawa, Kamakura, all of Japan

[73] Assignee: Nissan Motor Company, Limited, Kanagawa, Japan

[21] Appl. No.: 377,198

[22] PCT Filed: Oct. 5, 1981

[86] PCT No.: PCT/JP81/00264

§ 371 Date: May 7, 1982

§ 102(e) Date: May 7, 1982

[87] PCT Pub. No.: WO82/01168

PCT Pub. Date: Apr. 15, 1982

[30] Foreign Application Priority Data

Oct. 6, 1980 [JP]  Japan .................................. 55-139662

[51] Int. Cl.⁴ .......................... G08B 21/00; B60Q 5/00
[52] U.S. Cl. ..................................... 340/576; 180/272; 340/575
[58] Field of Search ................. 340/576, 575; 180/272

[56] References Cited

U.S. PATENT DOCUMENTS

| 3,222,639 | 12/1965 | Kayser, Jr. | 340/576 |
| 3,227,998 | 1/1966 | Platt | 340/576 |
| 3,654,599 | 4/1972 | Sepper | 340/576 |
| 4,017,843 | 4/1977 | Yanagishima | 340/576 |

Primary Examiner—Glen R. Swann, III
Attorney, Agent, or Firm—Lowe, King, Price & Becker

[57] ABSTRACT

A doze warning system has a circuit 20 for producing pulse signals representative of left- and right-hand steering angle variations, circuits 30 and 40 counting the pulse signal and producing a warning signal when the counter value reaches a threshold value, and a circuit 60 for producing a reset signal to clear the counter value when a difference between a number of pulse signals representative of the left-hand steering angle variations and a number of pulse signals representative of the right-hand steering angle variations exceeds a given value, or of a condition wherein the left-hand or right-hand pulse signals inputted exceeds a predetermined pulse number. The reset signal generating circuit detects a steering angle variation in excess of the threshold value in a normal driving condition such as passing through a curved road and produces the reset signal to inhibit production of the warning. By this reset signal generating circuit function, the warning system is prevented from malfunctioning.

13 Claims, 15 Drawing Figures

WARNING SYSTEM FOR DOZING AT WHEEL

FIELD OF THE INVENTION

The present invention relates to a system for detecting dozing of a driver at the wheel and for producing a warning. Particularly, the invention relates to a doze warning system for a vehicle for detecting abnormality in steering operation while a driver is dozing at wheel and for producing a warning.

BACKGROUND OF THE INVENTION

If a driver of a vehicle dozes at the wheel while driving a vehicle such as an automotive vehicle, a driving operation different from that in normal condition occurs. For example, in a steering operation while a driver dozes at the wheel, an abnormality variations and a number of pulse signals, frequency of steering or a stopping of steering operation for a period of time and then in operation can appear such as a decreased unnecessary increase in frequency of steering operations due to lowering a controllability. Therefore, by detecting characteristic of driving operation in dozing at wheel, a driver dozing at wheel can be detected. By detecting a driver dozing at wheel promptly, an appropriate warning can be produced for eliminating dozing.

In the meanwhile, driving operation similar to that appearing in dozing at wheel may occur on a road condition. Such a condition may cause erroneous detection of dozing even in normal driving condition, and may result in production of a warning, if a criterion for judgement of dozing at the wheel is not suitably selected. For example, upon entry of a relatively small radius curve road from a substantially straight road, steering operation frequency in the straight road is substantially low and an abrupt and large angle of steering operation occurs upon entry into the curve road. Thus, if the criterion for judgement for dozing at the wheel is selected as maintaining a steering operation frequency lower than a predetermined value for a period of time longer than a given period and thereafter abrupt occurrence of steering, an inconvenience such as the foregoing may occur in spite of the driving condition being normal. Therefore, to detect dozing at wheel promptly, it is critical to select an appropriate criterion of judgement.

Additionally, a relatively large steering angle variation will occur in a normal driving condition such as entry into or passing away from a curved road. In the normal driving condition, the relatively large steering angle variation is normally encountered in one steering direction. Therefore, a judgement of dozing can be made when steering angle variations is relatively large and the variation of steering angle does not occur in a single direction.

The present invention provides a warning system for detecting a driver dozing at the wheel by detecting abnormal driving conditions, particularly those occurring in dozing at the wheel, e.g., abnormally high frequency of and alternative direction of steering angle variations, and for producing a warning to awaken the driver.

Therefore, it is an object of the present invention to provide a warning system in which a normal driving condition causing a steering opreation frequency above a predetermined value is used to condition a judgement of dozing at wheel, so that a judgement of dozing at the wheel is made when the steering operation frequency is above the predetermined value and the normal driving condition criterion is not satisfied, thereby to produce a warning.

Another object of the present invention is to provide a warning system detecting steering operation in both right- and left hand directions occurs without inclination in one direction in which the frequency thereof exceeding the predetermined value is used to make the judgement of dozing to produce a warning.

A further object of the present invention is to provide a method for warning of dozing at the wheel by detecting right- and left hand steering angle variations, and to produce a warning when inclination of the steering angle variation does not occur and steering variation is above a predetermined value.

SUMMARY OF THE INVENTION

To accomplish the above-mentioned and other objects of the present invention, a warning system for dozing at the wheel, according to the invention, comprises means for detecting steering angle variation and producing a pulse signal representative of right- and left hand directions of steering angle variations, means for counting the pulse signal to produce a warning signal when the counted value reaches a predetermined threshold, and means for producing a reset signal for clearing the counted value when a difference of right- and left hand directions of steering angle variation exceeds a given value or when a number of pulses representative of respective right- or left-hand direction of steering angle variation exceeds a predetermined number.

Thus, if the steering angle variation exceeds a predetermined value while driving through a curved road under a normal driving condition, for example, the reset signal producing means detects the driving on the curved road and produces the reset signal to inhibit production of warning signal. By this function of the reset signal producing means, the warning system is prevented from malfunctioning.

Moreover, according to the present invention, there is provided a method for warning of dozing at the wheel, which method comprises the steps of detecting of steering angle variation, comparing the detected steering angle variation with a predetermined value and producing a warning when sequential steering angle variations in the right- of left-hand direction does not exceed a given value, a difference of steering angle variation in right- and left-hand direction does not exceed a predetermined ratio and steering angle variation exceeds the predetermined value.

In the above-mentioned method, discrimination as to driving through a curved road in a normal driving condition is made when steering angle variation in one direction occurs sequentially or steering angle variation is significantly inclined to one direction, and production of a warning is inhibitted to prevent from malfunctioning and to exactly detect dozing to produce warning.

DESCRIPTION OF THE PREFERRED EMBODIMENT

Figure 1:
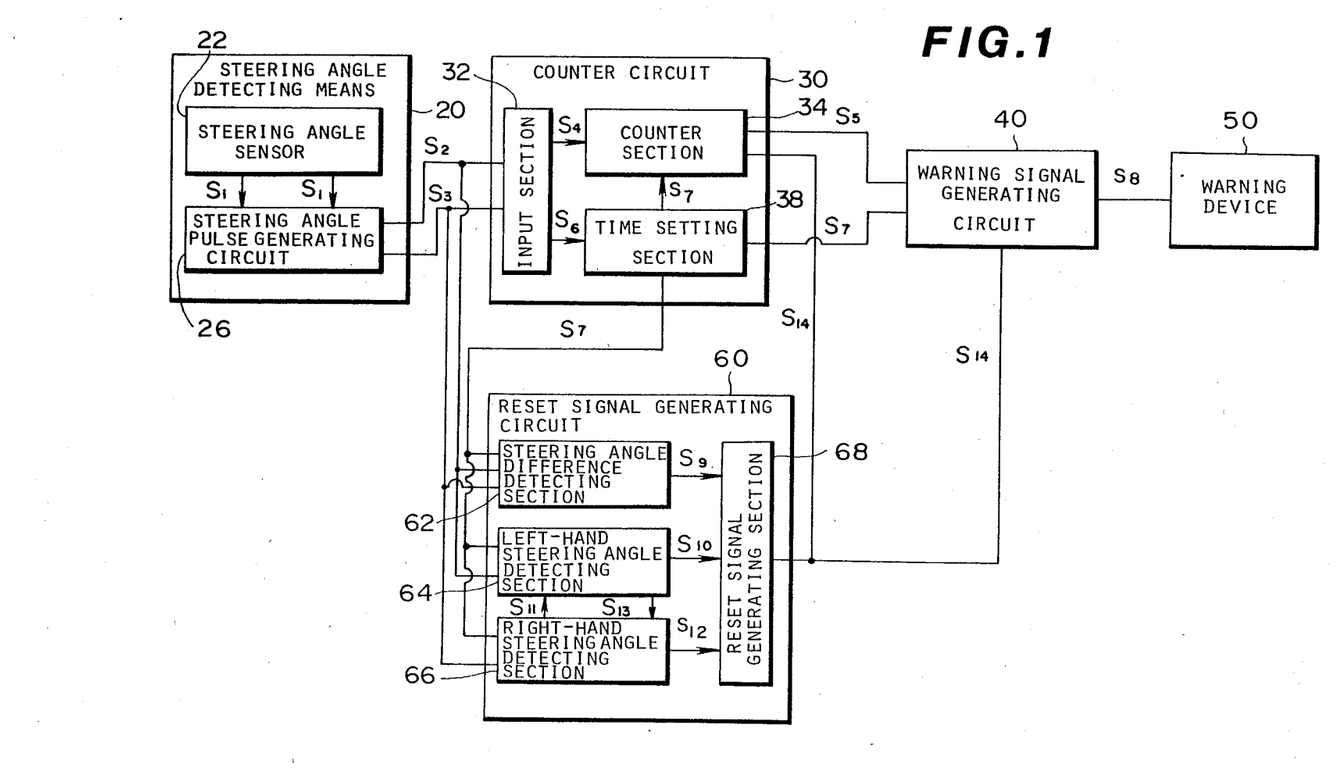
FIG. 1 is a block diagram of the preferred embodiment of doze warning system according to the present invention.
Figure 2:
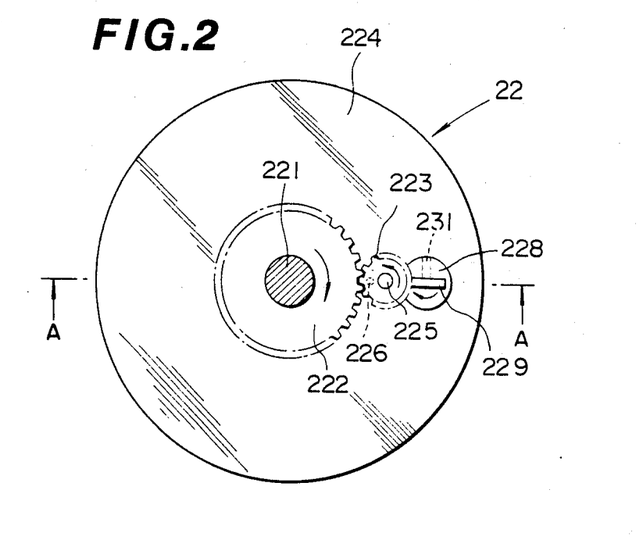
FIG. 2 is a plan view of one example of a steering angle sensor in FIG. 1.
Figure 3:
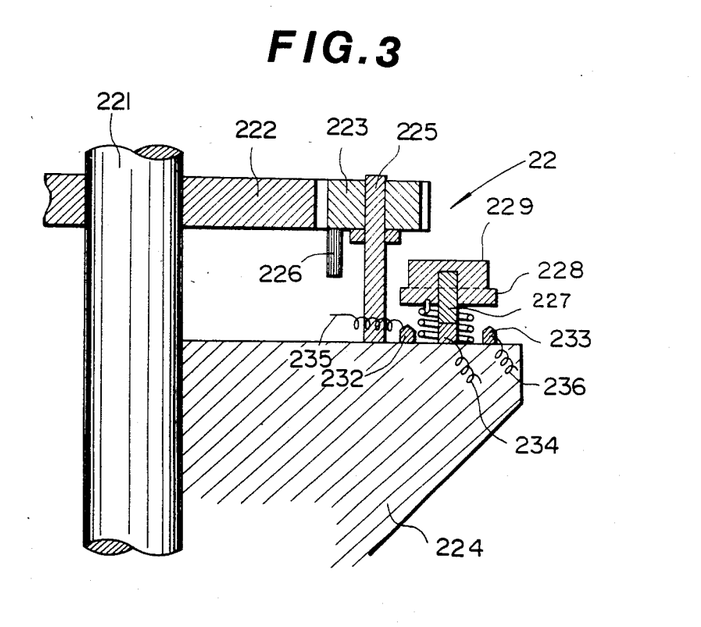
FIG. 3 is a sectional view taken along line A—A of FIG. 2.
Figure 4:
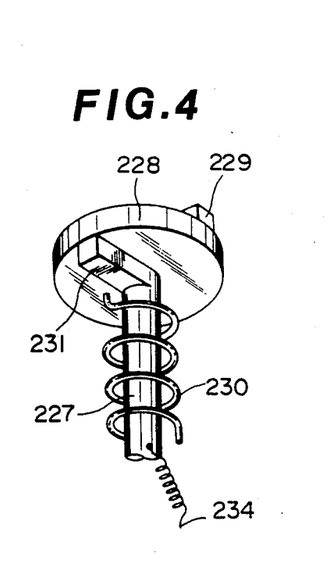
FIGS. 4 and 5 are perspective views of a movable contact plate of the steering angle sensor of FIG. 2.
Figure 5:
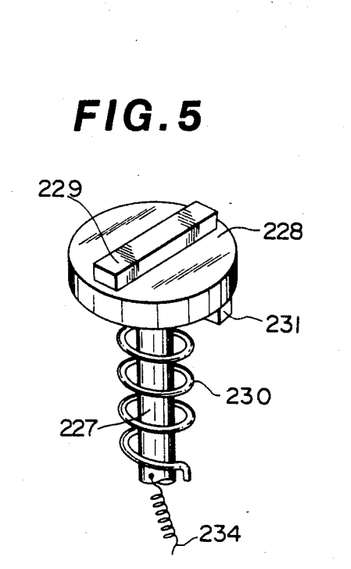

Referring to the accompanying drawings, particularly to FIG. 1, there is illustrated a block diagram of the preferred embodiment of doze warning system according to the present invention. A steering angle detector means 20 detects angle variation from a standard angular position of the steering to produce steering angle pulses $S_2$ and $S_3$ indicative of the steering direction for every 5 degrees of steering angle, for example. The steering angle detector means 20 comprises a steering angle sensor 22 and a steering angle pulse generating circuit 26. The steering angle sensor 22 may be of a type provided at a position adapted for detecting steering angle variation such as, for example, on a steering column to detect left-hand and right-hand rotational angle position of the steering column to produce a signal for each predetermined rotational angle displacement. The sensor may also be of the type adapted to detect working fluid pressure variation in the power steering hydraulic circuit to produce a signal representative of the detected working fluid pressure, and so on. The sensor signal $S_1$ outputted by the steering angle sensor 22 is inputted to the steering angle pulse generating circuit 26. The steering angle pulse generating circuit 24 produces steering angle pulses $S_2$ or $S_3$ for every 5 degrees of steering angle variation in left- or right-hand directions depending on the sensor signal $S_1$.

The steering angle pulses $S_2$ and $S_3$ are respectively fed to an input section 32 of a counter circuit 30. The input section 32 is turned on for a given period of time, for example 15 sec., in response to the steering angle pulse $S_2$ or $S_3$ to receive the trailing steering angle pulse, or is turned on for a given period of time, for example 5 sec., in response to the steering angle pulse and renewed the measurement of the given time in response to every trailing steering angle pulse. The input section 32 is responsive to the steering angle pulse $S_2$ and $S_3$ while it is maintained in an on position, to produce a pulse signal $S_4$. The pulse signal $S_4$ produced by the input section 32 is fed to a counter section 34. The counter section 34 counts up the number of pulse signals $S_4$ inputted at an interval shorter than a predetermined pulse interval and produces a counter signal $S_5$ when the counter value exceeds a predetermined threshold value. The counter value of the counter section 34 is cleared if the pulse signal of the input section is inputted for an interval longer than the predetermined pulse interval. On the other hand, a signal $S_6$ produced by the input section 32 and representative of the present time of the input section is fed to a time setting section 38. The time setting section 38 produces a pulse signal $S_7$ in response to the trailing edge of the signal $S_6$. The pulse signal $S_7$ is inputted to the counter section 34 to clear the counter value.

The counter pulse $S_5$ of the counter section 34 of the counter circuit 30 is inputted to the warning signal generating circuit 40 to turn the latter on. The warning signal generating circuit 40 produces a warning signal $S_8$ when the counter pulse $S_5$ is inputted and the pulse signal $S_7$ is inputted to establish an AND condition. A warning device 50 is responsive to the warning signal $S_8$ of the warning signal generating circuit 40 to produce a warning. The warning produced by the warning device can be selected among various kinds of warnings, for example, visible warnings one such as lamp, display and the like, or audible warnings such as buzzer, warning voice and the like.

On the other hand, the steering angle pulse $S_2$ and $S_3$ of the steering angle pulse generating circuit 26 is inputted to a reset signal generating circuit 60. The reset signal generating circuit 60 has a steering angle difference detecting section 62, left-hand steering angle detecting section 64 and right-hand steering angle detecting section 66. The steering angle difference detecting section 62 detects a difference of the steering angle pulses $S_2$ and $S_3$ within a period set by the time setting section 38 and produces a signal $S_9$ when the detected difference reaches a given value, e.g., 4. The left-hand steering angle detecting section 64 counts up the number of the steering angle pulse $S_2$ within the period set by the time setting section 38 and produces a signal $S_{10}$ when the counter value reaches a given value, e.g., 4. The counter value of the left-hand steering angle detecting circuit 64 is cleared in response to a count signal $S_{11}$ produced everytime the steering angle pulse $S_3$ is inputted to the right-hand steering angle detecting section 66. Likewise, the right-hand steering angle detecting section 66 counts up the steering angle pulse $S_3$ within a period set by the time setting section 38 and produces a signal $S_{12}$ when the counter value reaches a given value, e.g., 4. The counter value of the right-hand steering angle detecting section 66 is cleared in response to a count signal $S_{13}$ produced everytime when the steering angle signal $S_3$ is inputted to the left-hand steering angle detecting section 64. The reset signal generating circuit 60 further includes a reset signal generating section 68. The reset signal generating section 68 is responsive to one of signals $S_9$, $S_{10}$ and $S_{12}$ to produce a reset signal $S_{14}$. The reset signal $S_{14}$ of the reset signal generating section 68 is inputted to the counter section 34 of the counter circuit 30 to clear the counter value thereof and is inputted to the warning signal generating circuit 40 to make the latter inoperative.

FIGS. 2 to 9 show one example of the steering angle detecting means 20 of the system of FIG. 1. As shown in FIGS. 2 to 5, the steering angle sensor 22 of the steering angle detecting means 20 has a gear 222 fixedly secured to a steering column shaft 221 and a gear 223 engageable to the former gear. The gear 222 is rotatable with the steering column shaft 221 and steering column tube 224 and transmits rotation in left- and right-hand direction according to the steering operation to the gear 223. The gear 223 is rotatably mounted onto a rotational axle 225 protruded from the upper surface of the steering column tube 224. The gear 223 has a smaller diameter than that of the gear 222, which gear ratio of the gear 223 in relation to the gear 222 is selected so that the one cycle rotation of the gear 223 corresponds to a given rotational angle of the steering column shaft 221, e.g., 1 degree.

Figures 6, 7, 8:
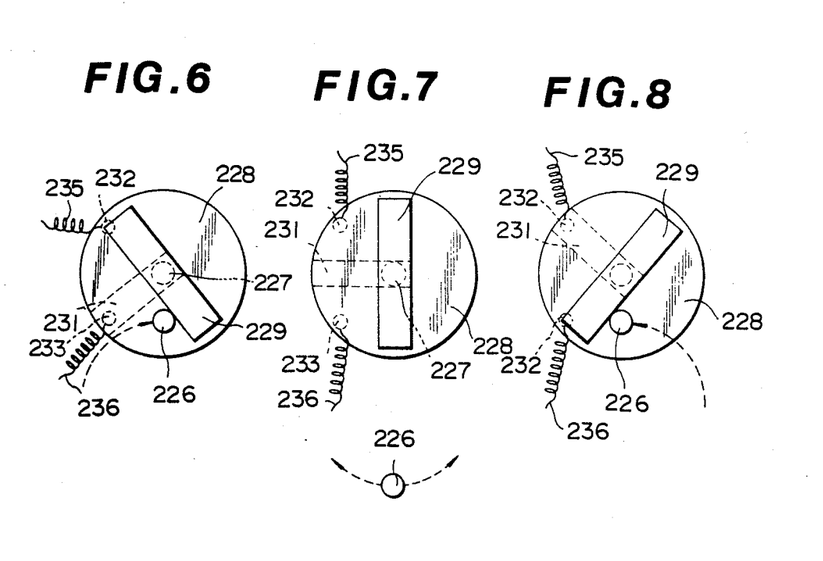
FIG. 6 is an enlarged plan view of the steering angle sensor in a position in which the steering is operated in the left-hand direction at a given angle.
FIG. 7 is an enlarged plan view similar to FIG. 6 and showing a position in which steering is in a neutral position.
FIG. 8 is an enlarged plan view similar to FIG. 6 and showing a position in which the steering is operated in the right-hand direction at a given angle.

A projection 226 is protruded from the bottom surface of the gear 223. The projection 226 opposes an elongated projection 229 formed on a movable contact disc 228 which is rotatably mounted on an axle 227 protruded from the steering column tube 224. The projection 226 of the gear 223 contacts against the elongated projection 229 to rotate the rotational contact disc 228 at a given angle while the gear 223 rotates, as shown in FIGS. 6 to 8. As will be appreciated from FIGS. 2 and 6 to 8, the given rotational angle in left- and right-hand directions of the movable contact disc 228 is defined by the positional relationship of the gear 223 and the movable contact disc 228 on the steering column tube 224 and the position of the projection 226.

The movable contact disc 228 engages with the upper end of a helical spring 230 the lower end thereof being engaged to the upper surface of the steering column tube and wound onto the axle 227. The helical spring 230 urges the movable contact disc 228 to a neutral position as shown in FIG. 7. The movable contact disc 228 is provided with a movable contact 231 on the lower surface thereof. Stationary contacts 232 and 233 are protruded on the upper surface of the steering column tube 224 at positions opposing to the movable contact 231. The movable contact 231 is rotatable in left- and right-hand directions according to the rotation of the movable contact disc 228. At the end of rotation, the movable contact 231 contacts to one of the stationary contacts 232 and 233. The movable contact 231 is connected to a power source (not shown) via line 234 and, in turn, the stationary contacts 232 and 233 are connected to counters 261 and 262 of the steering pulse generating circuit 26, as described hereafter (FIG. 9) via lines 235 and 236.

Figure 9:
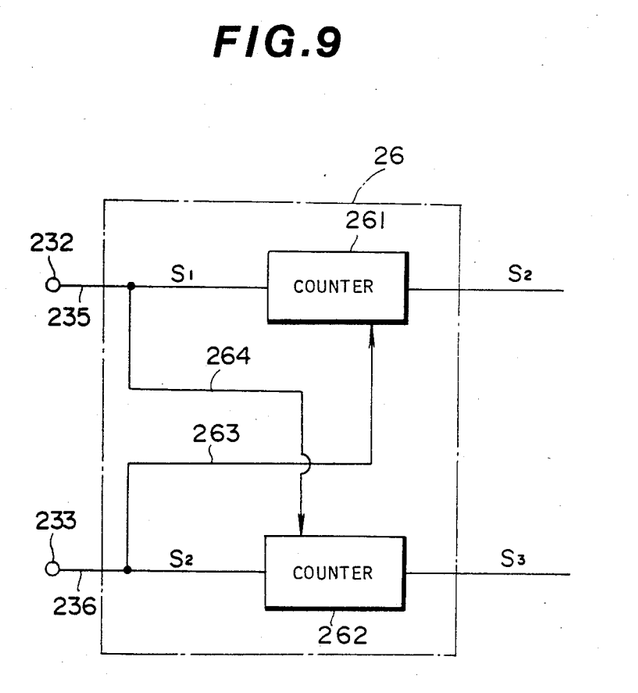
FIG. 9 is a block diagram of a steering pulse generating circuit of FIG. 1.

FIG. 9 shows one example of the steering angle pulse generating circuit 26 in the steering angle detecting means 20 of FIG. 1. The counters 261 and 262 are respectively connected to the stationary contacts 232 and 233 of the steering angle sensor 22 via the lines 235 and 236, as set forth. The counter 261 counts up the sensor signal $S_1$ produced when the steering is operated in the left-hand direction and thus the movable contact 231 comes to contact with the stationary contact 232. The counter 261 produces the steering angle pulse $S_2$ when the counter value thereof reaches a value, i.e., 5 in the shown embodiment, corresponding to a steering angle of 5 degrees. On the other hand, the counter 261 is connected to the stationary contact 233 via line 263 to receive the sensor signal $S_1$ indicative of right-hand steering operation which is produced when the steering is operated in the right-hand direction to contact the movable contact 231 with the stationary contact 233, and to clear the counter value thereof in response to the sensor signal $S_1$ of right-hand steering operation. Likewise, the counter 262 counts up the sensor signal $S_1$ inputted through the line 236 and produces the steering angle pulse $S_3$ when the counter value thereof reaches to 5, and is cleared the counter value by the sensor signal $S_1$ indicative of the left-hand steering inputted through a line 264.

Figure 10:
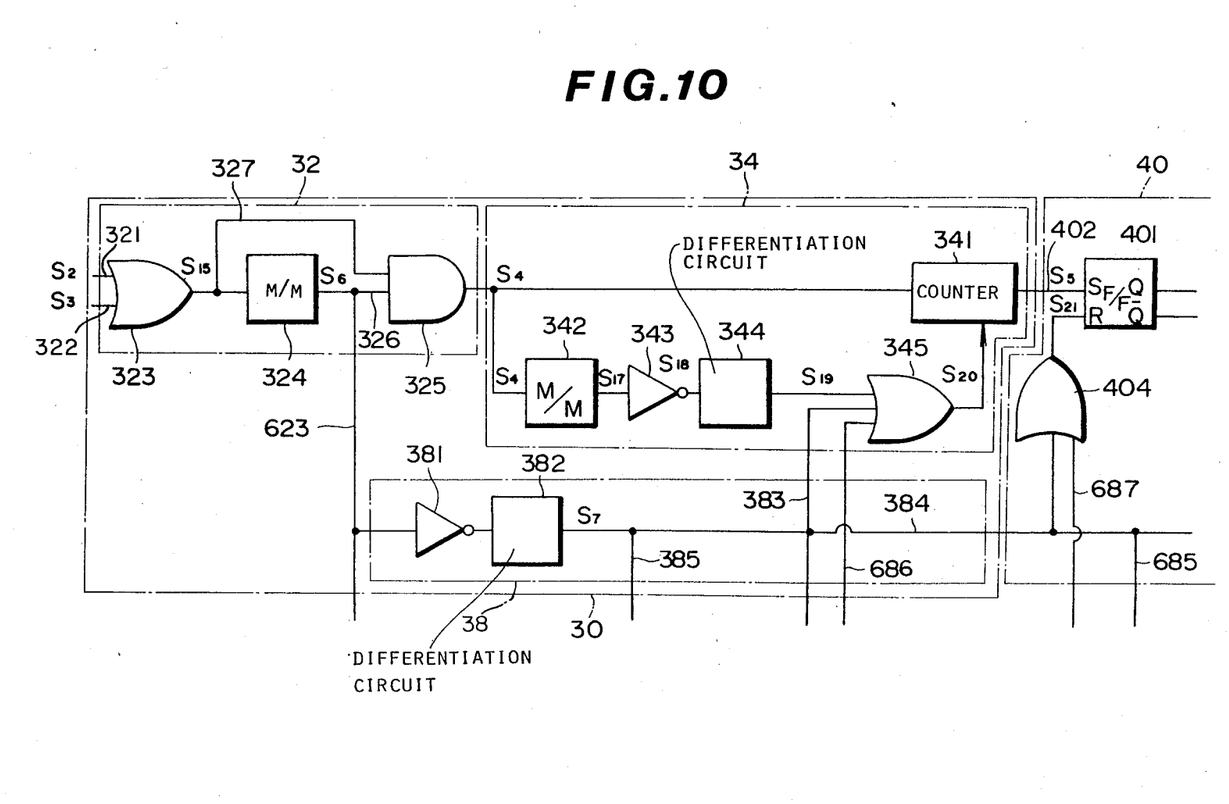
FIG. 10 is a block diagram of a counter circuit in FIG. 1.

FIG. 10 shows a block diagram illustrating a detail of the counter circuit 30 of the doze warning system of FIG. 1. The input section 32 comprises an OR gate 323 connected to the steering angle pulse generating circuit 26 via lines 321 and 322 and a monostable multivibrator 324 and an AND gate 325. The OR gate 323 is turned on in response to one of steering pulse signals $S_2$ and $S_3$ to produce a signal $S_{15}$. The monostable multivibrator 324 is responsive to the signal $S_{15}$ to turn on for a given period of time, e.g., 15 sec., to produce the signal $S_6$. The preset of period of time in the monostable multivibrator can be done otherwise. For example, it is possible to adapt the monostable multivibrator to turn on for a given period of time, e.g. 5 sec., everytime the signal $S_{15}$ of the OR gate is provided and to renew the period when the trailing signal $S_{15}$ is inputted while the multivibrator is maintained in an on condition.

The AND gate 325 is connected to the monostable multivibrator 324 via a line 326 and, in turn, connected to OR gate 323 via a line 327. Therefore, the OR gate signal $S_{15}$ from the OR gate 323 and the signal $S_6$ of the monostable multivibrator 324 are inputted to the AND gate 325. The AND gate 325 produces the pulse signal $S_4$ when the AND condition of the signals $S_{15}$ and $S_6$ is established. The pulse signal $S_4$ of the AND gate 325 is counted by a counter 341 of the counter section 34. The counter 341 counts up the number of the pulse signals $S_2$ and $S_3$ by counting up the number of pulse signal $S_4$ and produces a counter pulse $S_5$ when the counter value reaches a predetermined value, e.g., 7. The pulse signal $S_4$ of the AND gate 325 is further inputted to a monostable multivibrator 342 to turn the latter on for a given period of time, e.g., 3 sec. The monostable multivibrator 342 produces a signal $S_{17}$ while it is maintained in an on condition. The signal $S_{17}$ of the monostable multivibrator 342 is inverted by an inverter 343 to provide a signal $S_{18}$ to a differentiation circuit 344. The differentiation circuit 344 produces a signal $S_{19}$ by detecting raising of the inverter output $S_{18}$. The signal $S_{19}$ of the differentiation circuit 344 is inputted to an OR gate 345 to produce an OR signal $S_{20}$. OR signal $S_{20}$ is used to clear the counter value of the counter 341.

On the other hand, the signal $S_6$ of the monostable multivibrator 324 of the input section 32 is inverted by an inverter 381 of the time setting section 38 and then inputted to a differentiation circuit 382. The differentiation circuit 382 is responsive to raising of the inverter output to produce a pulse signal $S_7$. The pulse signal $S_7$ of the differentiation circuit 382 is fed to the OR gate 345 of the counter section 34 via line 383 to produce the OR signal $S_{20}$. By this OR signal $S_{20}$, the counter value of the counter 341 is cleared. At the same time, the pulse signal $S_7$ of the differentiation circuit 382 is fed to the warning signal generating circuit 40 and the reset signal generating circuit 60 via respective lines 384 and 385.

Figure 11:
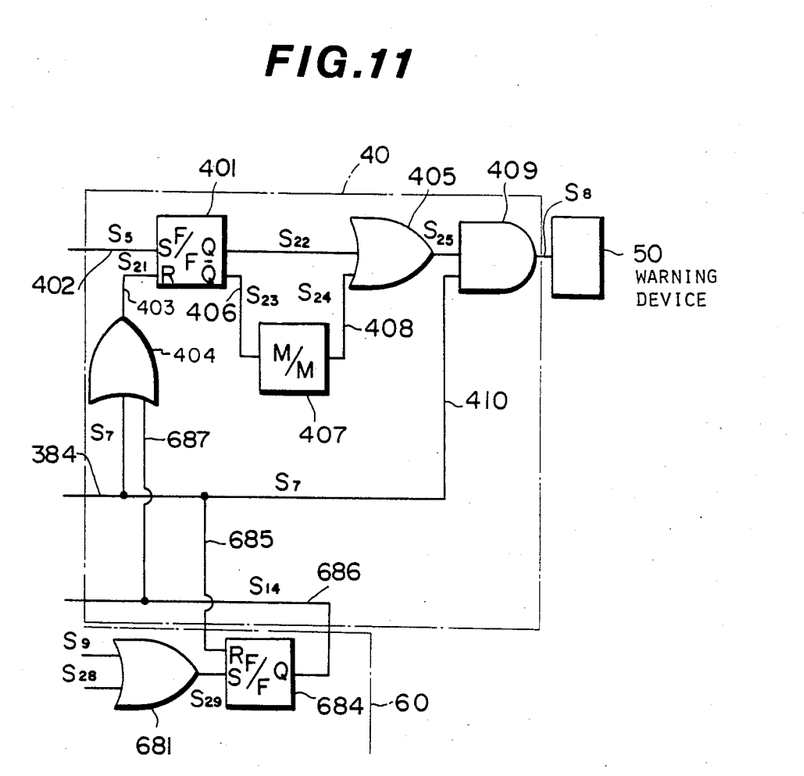
FIG. 11 is a block diagram of a warning signal generating circuit of FIG. 1.

FIG. 11 shows one embodiment of the warning signal generating circuit 40 in FIG. 1. A set terminal S of a flip-flop 401 is connected to the counter 341 of the counter circuit 30 via a line 402. The reset terminal of the flip-flop 401 is connected to the differentiation circuit 382 of the time setting section 38 via a line 403, an OR gate 404 and the line 384. Therefore, the flip-flop is set by the counter signal $S_5$ of the counter 341 and is reset by an OR signal $S_{21}$ of the OR gate 404 produced in response to the pulse signal $S_7$ of the differentiation circuit 382. The set-output terminal Q of the flip-flop 401 is connected to an OR gate 405 to feed a set signal $S_{22}$ to the OR gate 405. On the other hand, the reset-output terminal $\overline{Q}$ of the flip-flop 401 is connected to a monostable multivibrator 407 via a line 406 to feed thereto a reset signal $S_{23}$ which is produced in response to resetting of the flip-flop by the OR signal $S_{21}$. The monostable multivibrator 407 is responsive to the reset signal $S_{23}$ to turn on for a given period of time, e.g. 1 sec. to produce a signal $S_{24}$. The signal $S_{24}$ of the monostable multivibrator 407 is fed to the OR gate 405 via a line 408. The OR gate 405 is turned on in response to one of the set signal $S_{22}$ of the flip-flop or the signal $S_{24}$ of the monostable multivibrator 407 to produce an OR signal $S_{25}$. Thus, the duration of the OR signal $S_{25}$ is a sum of the period of time $t_1$ in which the flip-flop 401 is maintained on and the period of time in which the monostable multivibrator 407 is maintained on.

The OR signal $S_{25}$ of the OR gate 405 is fed to an AND gate 409. The AND gate 409 is, in turn, connected to the differentiation circuit 382 of the counter circuit 30 via lines 410 and 384 to produce the warning signal $S_8$ when an AND condition exists for the OR signal $S_{25}$ of the OR gate 405 and pulse signal $S_7$ of the differentiation circuit 382, to activate the warning device 50.

Figure 12:
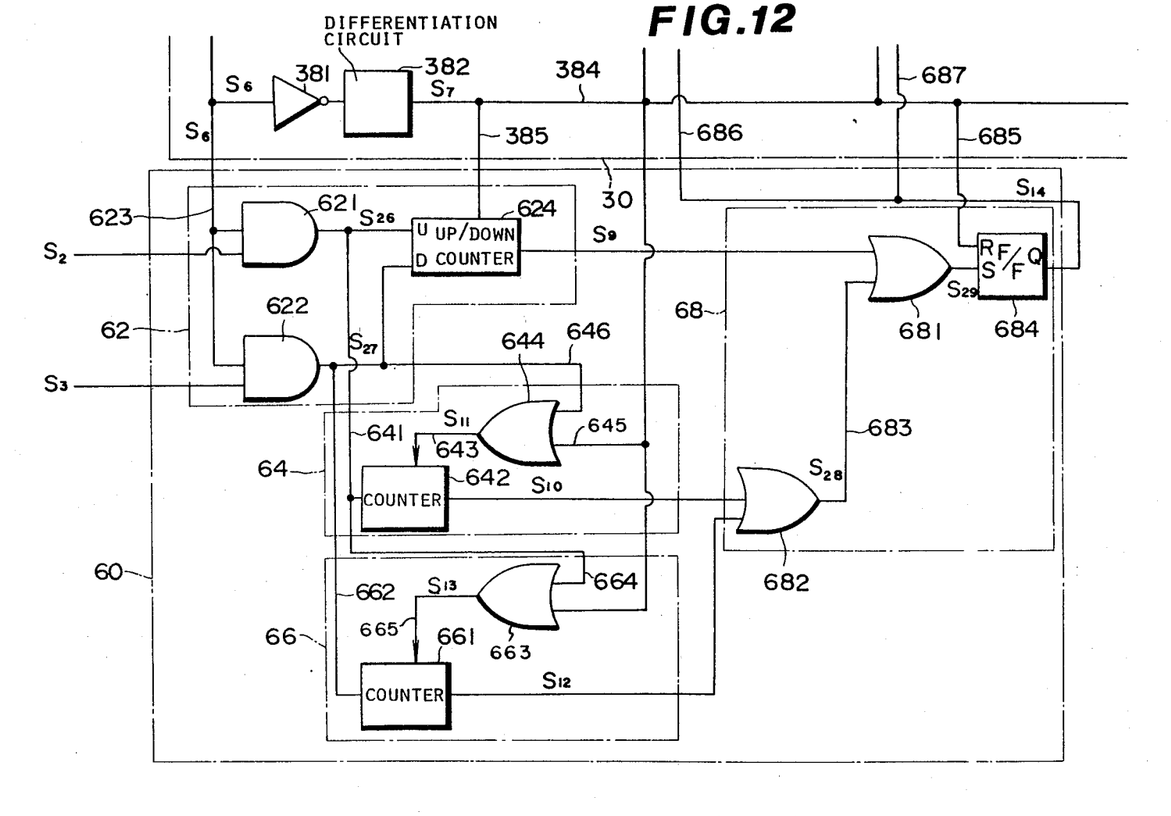
FIG. 12 is a block diagram of a reset circuit of FIG. 1.

FIG. 12 illustrates a detail of the reset signal generating circuit 60 of FIG. 1. The steering angle difference detecting section 62 and the left-hand steering detecting section 64 are connected to the counter 261 of the steering angle pulse generating circuit 26 (FIG. 9). Likewise, the steering angle difference detecting circuit 62 and the right-hand steering angle detecting circuit 66 are connected to the counter 262 of the steering angle pulse generating circuit 26. The steering angle difference detecting circuit 62 has AND gates 621 and 622. AND gates 621 and 622 are connected to the counters 261 and 262 respectively to receive the steering angle pulse $S_2$ and $S_3$. The other input terminals of the AND gates 621 and 622 are connected to the monostable multivibrator 324 of the input section 32 of the counter circuit 30 via a line 623 to receive the signal $S_6$. The AND gate 621 is connected to the up-input terminal U of an up/down counter 624 and produces an AND signal $S_{26}$ when an AND condition of the steering angle pulse $S_2$ and the signal $S_6$ of the monostable multivibrator 324 is established. The up/down counter 624 counts up the AND signal $S_{26}$. On the other hand, the AND gate 622 is connected to the down-input terminal of the up/down counter 624 and produces an AND signal $S_{27}$ when an AND condition of the steering angle pulse $S_3$ and the signal $S_6$ of the monostable multivibrator 324 is established. The up/down counter 624 counts down the AND signal $S_{27}$ to reduce the counter value. The up/down counter 624 produces a counter signal $S_9$ when the absolute value of the counter value reaches a predetermined value, e.g., 4. The counter signal $S_9$ is inputted to one of inputs of the OR gate 681 of the reset signal generating circuit 68. The counter value of the up/down counter 624 is cleared by the signal $S_7$ of the differentiation circuit 382. The AND signal $S_{26}$ of the AND gate 621 is further inputted to the counter 642 of the left-hand steering angle detecting section 64 via the line 641. The counter 642 counts up the AND signal $S_{26}$ inputted thereto and produces a counter signal $S_{10}$ when the counter value reaches a predetermined value, e.g., 4. The counter signal $S_{10}$ is inputted to an OR gate 682 of the reset signal generating circuit 68. On the other hand, the counter 642 is connected to an OR gate 644 via a line 643. The OR gate 644 is connected to the differentiation circuit 382 of the time setting section 38 of the counter circuit 30 via a line 645 and is connected to the AND gate 622 via a line 646. The OR gate 644 is turned on in response to one of the pulse signal $S_7$ of the dfferentiation circuit 382 and the AND signal $S_{27}$ of the AND gate 622 to produce an OR signal $S_{11}$ to be fed to the counter 642. This OR signal $S_{11}$ serves as a reset signal of the counter 642 to clear the counter value thereof.

A counter 661 of the right-hand steering angle detecting section 66 is connected to the AND gate 622 via a line 662. The AND signal $S_{27}$ is counted up by the counter 661. The counter 661 produces a counter signal $S_{12}$ when the counter value thereof reaches a predetermined value, e.g., 4, to feed to the OR gate 682. The counter 661 is further connected to the AND gate 621 via a line 665, an OR gate 663 and a line 664, and is connected to the differentiation circuit 382 via the OR gate 663 and the line 645. The OR gate 663 is turned on to produce an OR signal $S_{13}$ when the AND signal $S_{26}$ of the AND gate 621 or the pulse signal $S_7$ of the differentiation circuit 382 are inputted. By this OR signal $S_{13}$, the counter value of the counter 661 is cleared.

The OR gate 682 of the reset signal generating section 68 is turned on to produce an OR signal $S_{28}$ when either of counter signals $S_{10}$ or $S_{12}$ of the counters 642 and 661 is inputted. The OR signal $S_{28}$ of the OR gate 682 is fed to an OR gate 681 via a line 683. The OR gate 681 is turned on to produce an OR signal $S_{29}$ in response to one of the counter signal $S_9$ of the up/down counter 624 and the OR signal $S_{28}$ of the OR gate 682. The output terminal of the OR gate 681 is connected to a set-input S of a flip-flop 684 to set the latter with the OR signal $S_{29}$. The reset-input R of the flip-flop 684 is connected to the differentiation circuit 382 via a line 685. Therefore, the flip-flop 684 is reset when the pulse signal $S_7$ is produced in the differentiation circuit 382. The flip-flop 684 produces a reset signal $S_{14}$ on the output terminal Q while it is kept at set position. The output terminal Q of the flip-flop 684 is connected to the OR gate 345 of the counter circuit 30 via a line 686 to produce an OR signal $S_{20}$ in response to the reset signal $S_{14}$, and is connected to an OR gate 404 of the warning signal generating circuit 40 via a line 687. The OR gate 404 produces a signal $S_{21}$ in response to the reset signal. Therefore, the flip-flop 684 is set and counter value of the counter 341 is cleared. At this time, the flip-flop 401 of the warning signal generating circuit 40 is reset.

Figure 13:
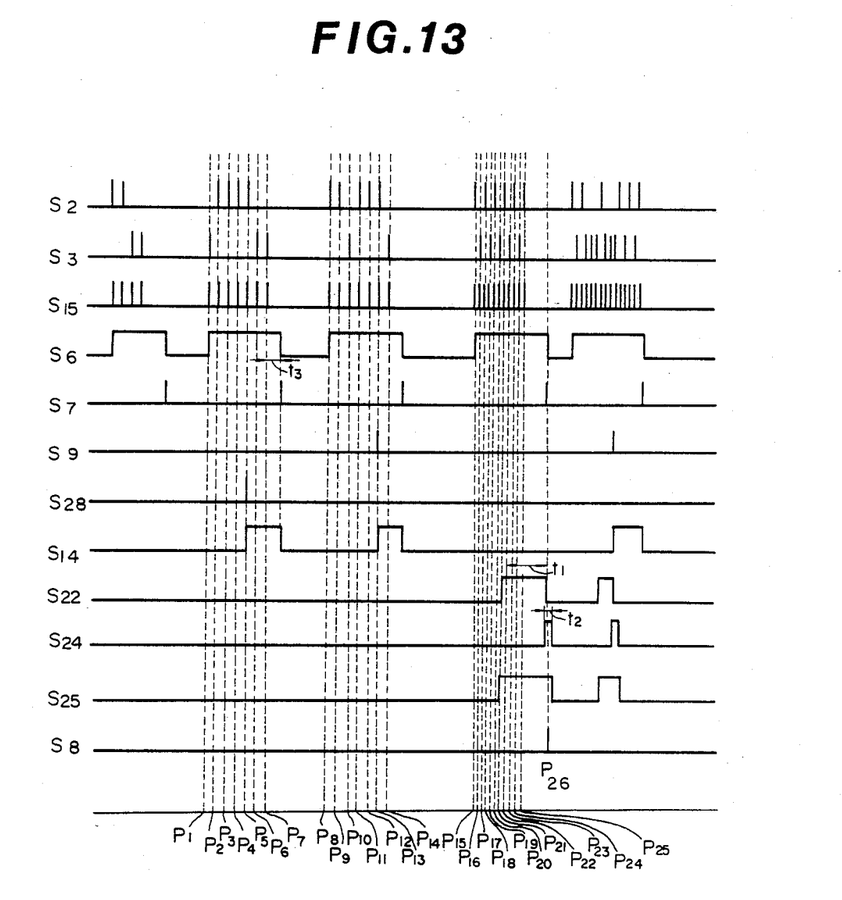
FIG. 13 is a timing chart showing operation of the system of FIG. 1.

The operation of the foregoing embodiment will be explained hereinbelow with reference to the timing chart of FIG. 13. As apparent from the timing chart of FIG. 13, the monostable multivibrator 324 of the counter circuit 30 of the foregoing embodiment is maintained in an on condition for the predetermined period $t_3$, e.g., 5 sec., after inputting the last OR signal $S_{15}$ which is sequentially inputted. For instance, assuming the steering angle pulses $S_2$ of the steering angle pulse generating circuit 26 are inputted at time $P_2$, $P_3$, $P_4$ and $P_5$ and the steering angle pulses $S_3$ are inputted at time $P_1$, $P_6$ and $P_7$, the OR gate 323 produces OR signals $S_{15}$ at each time point $P_1$ to $P_7$. The monostable multivibrator 324 is turned on at the time point $P_1$ and maintained on for the predetermined period $t_3$ after the time point $P_7$ at which the last OR signal is inputted. The AND gate 325 produces the AND signal $S_4$ every time when even an AND condition is established for the output $S_6$ of the monostable multivibrator 324 and OR signal fed from the OR gate 323 via the line 327 and feeds it to the counter 341. On the other hand, at the same time, the AND signal $S_4$ of the AND gate 325 is inputted to the monostable multivibrator 342 to turn the latter on for the predetermined period, e.g., 3 sec. In an on condition of the monostable multivibrator 342, the inverter 343 produces the signal $S_{18}$ in response to the trailing edge of the signal $S_{17}$ and thereby produces the signal $S_{19}$ in the differentiation circuit 344. The signal $S_{19}$ of the differentiation circuit 344 is fed to the OR gate 345 to produce the signal $S_{20}$. The OR signal $S_{20}$ of the OR gate 345 is inputted to the counter 341 to clear the counter value thereof.

Thus, in the foregoing embodiment, if the pulse interval of the steering angle pulse $S_2$ and $S_3$ exceeds 3 sec., the counter value of the counter 341 is cleared. Namely, the counter produces the counter signal $S_5$ when predetermined numbers of the steering angle pulses $S_2$ and $S_3$ are inputted with pulse intervals less than 3 sec.

On the other hand, at the time points $P_2$, $P_3$, $P_4$ and $P_5$, the AND signal $S_{26}$ of the AND gate 621 produced in response to the steering angle pulse $S_2$ is inputted to up-input U of the up/down counter 624 of the steering angle difference detecting circuit 62 and the AND signal $S_{27}$ of the AND gate 622 produced in response to the steering angle pulse $S_3$ at the time point $P_1$, $P_6$ and $P_7$ is inputted to the down-input D of the up/down counter 624. At this time, the maximum counter value of the up/down counter 624 is 3 and does not reach at the predetermined value, i.e., 4. Therefore, the up/down counter 624 does not produce the counter signal. At the same time of the counting operation of the up/down counter, the counter 642 of the left-hand steering detecting circuit 64 counts up the AND signal $S_{26}$ inputted thereto at time points $P_2$, $P_3$, $P_4$ and $P_5$. At the time point $P_5$ at which the counter value of the counter reaches to 4, the counter 643 produces the counter signal $S_{10}$. The flip-flop 684 is set in response to the OR signal $S_{29}$ of the OR gate 681 which is produced in response to the counter signal $S_{10}$ of the counter 624. Thus, the counter value of the counter 341 is cleared at the time point $P_5$ by the OR signal $S_{20}$ of the OR gate 345.

Assuming the steering angle pulse $S_2$ is produced at time points $P_8$, $P_9$, $P_{11}$, $P_{12}$ and $P_{13}$ and, on the other hand, the steering angle pulse $S_3$ is produced at time points $P_{10}$ and $P_{14}$, the up/down counter 624 counts up the AND signal $S_{26}$ of the AND gate 621 inputted at the time points $P_8$, $P_9$, $P_{11}$, $P_{12}$, and $P_{13}$ and counts down the AND signal $S_{27}$ of the AND gate 622 inputted at time points $P_{10}$ and $P_{14}$. The counter value of the up/down counter 624 becomes 4 at the time point $P_{13}$ to cause output of counter signal $S_9$. Therefore, OR signal $S_{20}$ is produced in the OR gate 345 to clear the counter value of the counter 341.

Further assuming that the steering angle pulse $S_2$ is inputted at time points $P_{15}$, $P_{17}$, $P_{19}$, $P_{21}$, $P_{23}$ and $P_{25}$ and the steering angle pulse $S_3$ is inputted at time points $P_{16}$, $P_{18}$, $P_{20}$, $P_{22}$ and $P_{24}$, the flip-flop 684 is maintained at a reset condition by alternatively inputted AND signals $S_{26}$ and $S_{27}$. Therefore, when the counter 341 counts up to 7, the counter signal $S_5$ is produced. By the counter signal $S_5$, flip-flop 401 is set. The set signal $S_{22}$ of the flip-flop 401 is fed to the OR gate 405 to cause output of OR signal $S_{25}$. The OR signal $S_{25}$ of the OR gate 405 is kept on for the set period 1 sec., of the monostable multivibrator 407 after the flip-flop 401 being reset by the signal $S_7$ of the differentiation circuit 382 produced at time point $P_{26}$ expiring the reset period, 15 sec. An AND condition of the OR signal $S_{25}$ and the signal $S_7$ of the differentiation circuit 382 is established at the time point $P_{26}$ to produce the warning signal $S_8$. Thus, the warning device 50 is responsive to produce warning at the time point $P_{26}$.

Figure 14:
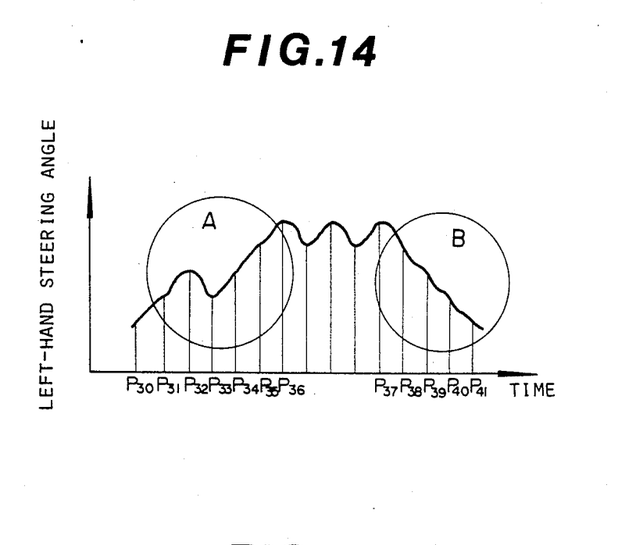
FIG. 14 is an illustration showing a steering angle variation while passing through a left-hand curve road.
Figure 15:
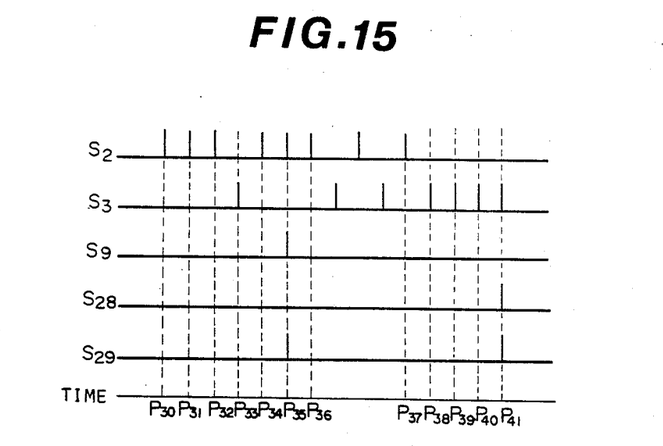
FIG. 15 is a timing chart showing the system operation corresponding to driving condition of FIG. 14.

Here, the operation of the up/down counter 624 of the steering angle difference detecting circuit 62 corresponding to steering angle variation in actual steering operation will be described herebelow with reference to FIGS. 14 and 15. FIG. 14 shows a steering variation appearing as passing through left-hand curved road and FIG. 15 shows a timing chart of the signals corresponding to the steering angle variation. In FIG. 14, the portions encircled by circles A and B respectively show steering angle variation for passage through a left-wardly curved portion of the road and for return to straight-ahead steering. In the portion encircled by circle A, the left-hand steering angle variation is gradually increased as entering into the curved portion of the road and in the portion encircled by the circle B, the steering is rotated in the right-hand direction to return to the neutral position. The steering angle detecting means 20 produces the steering angle pulse $S_2$ every time the steering angle is varied by 5 degrees. At time points $P_{30}$ to $P_{32}$, the steering angle is varied by about 10 degrees in the left-hand direction and at the time point $P_{33}$, the steering angle is returned in right hand direction by about 5 degrees. In the period between the time points $P_{33}$ to $P_{36}$, the steering angle is varied in the left-hand direction by about 15 degrees. According to this steering operation, the steering angle detecting means 20 produces left-hand steering angle pulses $S_2$ in the period $P_{30}$ to $P_{32}$ and $P_{34}$ to $P_{36}$ and a right-hand steering angle pulse $S_3$ at the time point $P_{33}$. On the other hand, during returning the steering to a neutral position, the steering angle varies by 20 degrees within a period from time point $P_{37}$ to the time point $P_{41}$ and thereby are produced the right-hand steering angle pulses $S_3$.

The up/down counter 624 counts up the AND signal $S_{26}$ of the AND gate 621 corresponding to the steering angle pulse $S_2$. At the time point $P_{33}$, the counter value of the up/down counter 624 is 3. Here, the up/down counter 624 counts down the AND signal $S_{27}$ of the AND gate 622 corresponding to the steering angle pulse $S_3$ and therefore the counter value becomes 2. At the time point $P_{35}$, the counter value becomes 4 in response to the AND signal $S_2$. Then the counter signal $S_9$ of the up/down counter 624 is produced and thus the flip-flop 684 is set.

Subsequently, steering returns to the neutral position. This time, the counter 661 of the right-hand steering angle detecting circuit 66 counts up the AND signal $S_{27}$. The counter value of the counter 661 becomes 4 at the time point $P_{41}$ to produce the counter signal $S_{12}$ to set the flip-flop 684.

As explained hereabove, in the doze warning system according to the present invention, the decision that the driver is dozing at the wheel is made when a number of steering pulses which exceeds a predetermined value, are produced within a predetermined period and the steering direction is not a single direction, namely when alternative directions of steering operation in left- and right-hand are unnecessarily carried out. Therefore, detection of dozing is made to never cause malfunction of the system by mis-judgement.

It should be noted that the left- and right-hand steering angle detecting sections 64 and 66 are not always necessary and it is possible to produce the reset signal by the up/down counter 624 alone. Further, the invention is not limited to the circuit construction of the specific embodiment and can be embodied otherwise.

What is claimed is:

1. A doze warning system comprising:
   a steering angle detecting means 20 for producing steering angle pulses $S_2$ or $S_3$ depending on the steering direction every time the steering angle changes by a predetermined angular value;
   a reset signal generating circuit 62 differentially counting pulses $S_2$ and $S_3$ and producing a reset signal $S_9$ when the difference reaches a predetermined value within a predetermined period measured from inputting the first steering angle pulse;
   a warning signal generating means 30 and 40 for producing a warning signal $S_8$ when a counter value of the steering angle pulses reaches a predetermined threshold value within said given period, which counter value is reset in response to said reset signal; and
   a warning device responsive to said warning signal to produce warning.

2. The system as set forth in claim 1, wherein the warning signal generating means comprises a counter circuit 30 including a counter 341 for counting up the steering angle pulses and a time setting circuit for operating said counter for said given period and producing a pulse signal $S_7$ at the end of the given period, and a warning signal generating circuit 40 responsive to a counter signal $S_5$ produced when the counter value of said counter reaches the predetermined threshold value to turn on and responsive to said reset signal $S_9$ to turn off, said warning signal generating circuit producing a warning signal $S_8$ when said counter signal $S_5$ is inputted while said warning signal generating circuit is turned on.

3. The system as set forth in claim 1, wherein said reset signal generating circuit includes an up/down counter 624 which counts up in response to steering angle pulses representative of one direction of steering angle variation and counts down in response to steering angle pulses representative of the other direction of steering angle variation.

4. A doze warning system, comprising:
   a steering angle detecting means 20 for producing steering angle pulses $S_2$ or $S_3$ depending on the steering direction every time the steering angle changes by a predetermined angular value;
   a first reset signal generating circuit 62 differentially counting pulses $S_2$ and $S_3$ and producing a first reset signal $S_9$ when the difference reaches a predetermined value within a predetermined period measured from inputting of the first steering angle pulse;
   a second reset signal generating circuit 64 and 66 for producing second reset signal $S_{10}$ or $S_{12}$ when a count of either left- or right-hand steering angle pulses reaches a predetermined value;
   a warning signal generating means 30, 40 for producing a warning signal $S_8$ when a counter value of the steering angle pulses reaches a predetermined threshold value within said given period, which counter value is reset in response to any of said reset signals $S_9$, $S_{10}$, or $S_{12}$; and
   a warning device 50 for producing a warning in response to the warning signal.

5. The system as set forth in claim 4, wherein said first reset signal generating circuit includes an up/down counter 624 which counts up in response to steering angle pulses representative of one direction of steering angle variation and counts down in response to steering angle pulses representative of the other direction of steering angle variation.

6. The system as set forth in claim 4, wherein the warning signal generating means comprises a counter circuit 30 including a counter 341 for counting up the steering angle pulses and a time setting circuit for operating said counter for said given period and producing a pulse signal $S_7$ at the end of the given period, and a warning signal generating circuit 40 responsive to a counter signal $S_5$ produced when the counter value of said counter reaches the predetermined threshold value to turn on and responsive to any of said first reset signal $S_9$ or second reset signal ($S_{10}$, $S_{12}$) to turn off, said warning signal generating circuit producing a warning signal $S_8$ when said counter signal $S_5$ is inputted while said warning signal generating circuit is turned on.

7. A doze warning system comprising:
   a steering angle detecting means for detecting steering angle variation and producing first signals $S_2$ or $S_3$ depending on the direction of the detected steering angle variation;
   a warning signal generating means for counting up said first signals within a given period and producing a warning signal $S_8$ when the counter value reaches a predetermined threshold value;
   a reset signal generating means for detecting a steering angle variation in excess of a given value in one direction and producing a reset signal $S_{14}$ responsively thereto; and
   a warning device 50 responsive to said warning signal to produce a warning.

8. The system as set forth in claim 7, wherein said warning signal generating means comprises a counter circuit 30 for counting up said first signals $S_2$ or $S_3$ and producing a second signal when the counter value exceeds said predetermined threshold value and a warning signal generating circuit 40 being set in response to said second signal and being reset in response to said reset signal $S_{14}$.

9. A system as set forth in claim 7 or 8, wherein said reset signal generating means 60 includes an up/down counter 624 which counts up the first signal $S_2$ produced in response to the first direction of steering operation and counts down the first signal $S_3$ in response to the second direction of steering operation, which second direction is different from said first direction, and produces the reset signal $S_{14}$ when the counter value reaches said given value.

10. The system as set forth in claim 9, wherein said reset signal generating means includes a first counter 642 for counting up the first signal indicative of a first direction of steering angle variation and producing said reset signal $S_{14}$ when the counter value reaches a predetermined value, said first counter being reset in response to the first signal $S_3$ indicative of the second direction of steering angle variation, and a second counter for counting up the first signal $S_3$ of the second direction and producing said reset signal $S_{14}$ when the counter value reaches the predetermined value, said second counter being reset in response to the first signal $S_2$ of the first direction.

11. The system as set forth in claim 8, wherein said counter circuit 30 includes a time setting section 38 for defining said period for counting said first signal and producing a pulse signal $S_7$ at the end of said period, and said warning signal generating circuit 40 being responsive to said pulse signal $S_7$ while in a set state.

12. A method for warning of dozing at the wheel comprising:
   detecting steering angle variations within a given period;
   producing a warning when the detected steering angle variations reach a predetermined threshold value;
   determining a difference of the steering angle variations in a first direction and steering angle variations in a second direction; and
   clearing said detected value to inhibit production of a warning when the difference of the steering angle variations in the first and second directions reaches a predetermined value.

13. The method as set forth in claim 12, which further comprises the step of producing a predetermined period of delay time after the detected variations reach said predetermined threshold value before producing the warning and inhibiting production of the warning when the difference of the steering angle variations in first and second directions reaches said predetermined value.

* * * * *